Sept. 29, 1925.
H. D. POWNALL
EXPANSION VALVE
Filed Oct. 18, 1924
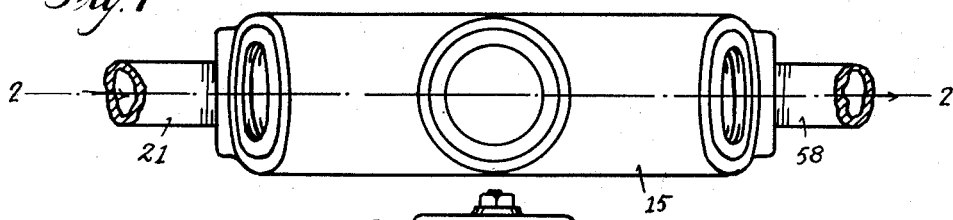
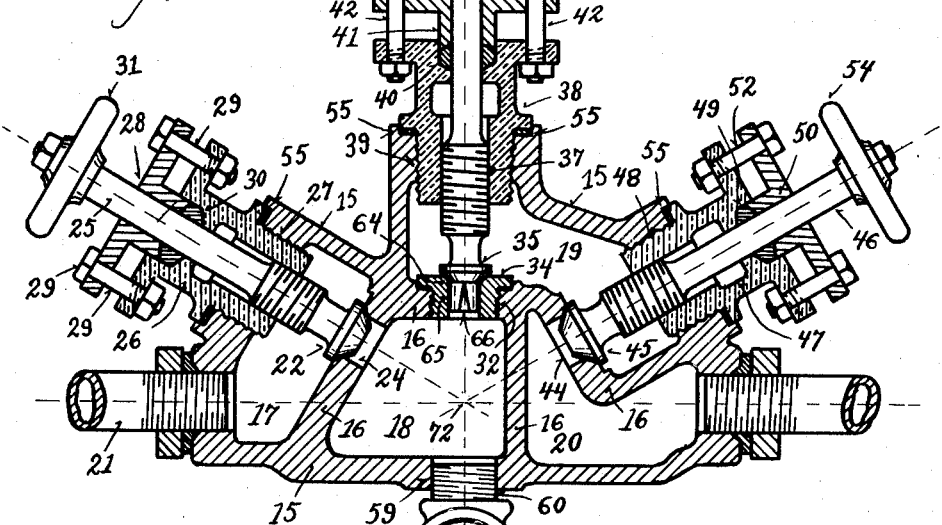
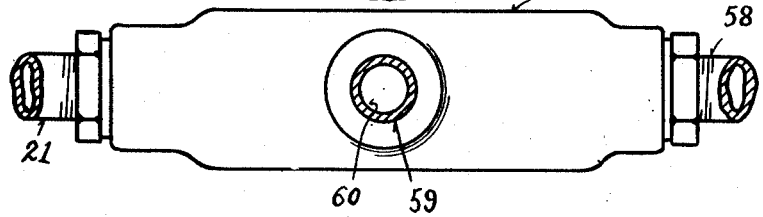
Inventor
Henry D. Pownall,
By C. W. Miles,
Attorney Patented Sept. 29, 1925.

1,555,075

UNITED STATES PATENT OFFICE.

HENRY D. POWNALL, OF CANTON, OHIO.

EXPANSION VALVE.

Application filed October 18, 1924. Serial No. 744,500.

*To all whom it may concern:*

Be it known that I, HENRY D. POWNALL, a citizen of the United States, residing at Canton, in the county of Stark and State of Ohio, have invented certain new and useful Improvements in Expansion Valves, of which the following is a specification.

My invention relates to improvements in valves. One of its objects is to provide an improved expansion valve for refrigerating machines. Another object is to provide an improved expansion valve in which pressure may be cut off from each side of the expansion valve to enable access to be conveniently and safely had to the expansion valve to renew the valve or valve seat, or to repack the valve. Another object is to provide an improved valve having four compartments and three independently operable valves. Another object is to provide an improved valve casing having four compartments with interconnecting ports to be independently controlled by three valves, and in which all the machine work on the casing may be accomplished without removing the valve casing from its holding chuck. Another object is to provide an improved valve casing having four compartments with ports to be independently controlled by three valves, and in which the axes of the respective ports and valves intersect to enable all the machine work upon the valve casing to be performed without removing the casing from its holding chuck. My invention also comprises certain details of form and combination of components all of which will be fully set forth in the description of the accompanying drawings, in which:

Fig. 1 is a side elevation of my improved valve casing with the valves and valve bonnets detached.

Fig. 2 is a section through my improved valve with the valves in place taken on line 2—2 of Figure 1.

Fig. 3 is a side elevation of the valve casing, showing the reverse side to that shown in Fig. 1.

The accompanying drawings illustrate the preferred embodiment of my invention, in which 15 represents the valve casing divided by angularly arranged partition walls 16 into four chambers 17, 18, 19 and 20. Liquefied ammonia for instance is supplied through the pipe 21 to chamber 17. A valve 22 may be operated to open or close a port 24 leading through the partition 16 from the chamber 17 to the chamber 18. The valve 22 is operated by means of a valve stem 25 threaded into a bonnet 26 which in turn is threaded into a port or passage 27 through the outside wall of the chamber 17. A stuffing gland 28 is held in place by means of bolts 29 and serves to compress the packing 30 tightly about the stem 25 of the valve. A hand wheel 31 is mounted upon the outer end of the valve stem 25.

A port or passage 32 leads from the chamber 18 into the chamber 19 through the partition wall 16, and is preferably provided with a removable and renewable valve seat 34. An expansion valve 35 is mounted upon the inner end of the valve stem 36 and is adapted to be adjusted into and out of engagement with the valve seat 34 to any desired extent by means of threads 37 on the valve stem 36 engaging counterpart threads in the bonnet 38. The bonnet 38 is threaded into a port or passage 39 through the outside wall of chamber 19. The bonnet 38 is provided with packing 40, and a gland 41 adjustable by means of bolts 42 to compress the packing about the valve stem 36. A hand wheel 43 is mounted upon the outer end of the valve stem 36.

A valve port 44 leads from the chamber 19 through the partition wall 16 into the chamber 20. A valve 45 at the inner end of a valve stem 46 serves to open and close the port 44. The valve stem 46 is threaded into a port or passage 48 through the outside wall of chamber 19. The bonnet 47 is provided with packing 49 and a gland 50 adjustable by bolts 52 to compress the packing 49 about the valve stem 46. A hand wheel 54 is mounted upon the outer end of the valve stem 46. I preferably provide soft metal gasket 55 to pack the joints where the bonnets 26, 38, and 47 are fitted to the outside wall of the valve casing. A pipe 58 leads the expanding ammonia or other refrigerant from the valve chamber 20 to the circulating system of the refrigerating apparatus.

A threaded port or passage 59 through the outside wall of the valve casing leads to the chamber 18, and is designed to enable the liquefied or gaseous contents of valve chambers 18 and 19 to be drained away. The passage 59 may be closed by a standard pipe plug, or may be connected by a short nipple 60 with a valve 62, by means of which the contents of chambers 18 and 19 may be drained away preparatory to renewing the expansion valve, or its seat or repacking the expansion valve. The expansion valve is preferably provided with a beveled seat 64 and a cylindrical section 65 to fit the cylindrical bore of the valve seat 34. The cylindrical section 65 is preferably provided with one or more wedge shaped channels 66 whereby the amount of liquid allowed to flow past the expansion valve may be accurately adjusted, depending upon the amount said groove 66 is lifted above the upper end of the bore 34.

In operation, the two valves 22 and 45 are normally open to allow a flow of liquid or gas from chamber 17 through port 24 to chamber 18, and from chamber 19 through port 44 to chamber 20. The expansion valve is then adjusted to permit an accurately regulated amount of liquid refrigerant to pass from chamber 18 to chamber 19 through the port 66 in the valve seat 34.

In the event that the expansion valve does not function properly, the valves 22 and 45 are closed tightly to cut off communication through port 24 from chamber 17 to chamber 18, and to cut off communication between chamber 19 and chamber 20 through port 44. The refrigerant is then drained from chambers 18 and 19, for instance through the valve 62 to a waste pipe conduit 70, whereupon the packing 40 may be removed and renewed, or the bonnet 38 and valve 35 removed, and the valve or its seat renewed as may be required after which the parts are replaced and the valves 22 and 45 opened and the expansion valve again adjusted to control the flow of refrigerant.

It will be noted that the ports 39, 32 and 59 are in substantially one plane and hence adapted to be successively machined, faced and threaded with one adjustment of the work or valve casing in a work holding chuck. It will also be noted that the relation and arrangement of the chambers and partitions in the valve casing are such that the ports 27 and 24 and ports 48 and 44 and also the ports for the conduits 21 and 58 may be machined, faced and threaded without disturbing the position of the valve casing in its work holding chuck by adjusting the work holding chuck concentrically about a center indicated by 72 upon the valve casing in Fig. 2. I am thus enabled to produce my improved valve quickly, economically, and reliably with parts that may be interchangeably employed, and to avoid the use of a multiplicity of expensive valve casings and pipe fittings and to reduce to a minimum the number of joints liable to cause leakage.

The apparatus herein shown and described is capable of considerable modification within the scope of the claims without departing from the spirit of my invention.

What I claim is:

1. An expansion valve comprising a valve casing divided by partition walls into three or more valve compartments, ports arranged in substantially one plane and connecting said compartments in series, a plurality of valves to open and close said ports, a plurality of valve stems operable from the exterior of said valve casing to actuate said valves and arranged in substantially one plane, to enable the machine work upon said valve casing to be effected by moving said valve casing to different positions of adjustment in one plane.

2. An expansion valve comprising a valve casing divided by partition walls into four valve compartments, a supply conduit connected to the first of said compartments, a valve port through one of said partition walls from the first to the second compartment, a valve operable from the exterior of said valve casing to open and close said valve port from the first to the second compartment, a valve port through one of said partition walls from the second to the third of said compartments, a valve operable from the exterior of said valve casing to open and close said valve port from the second to the third compartment, a valve port leading through one of said partition walls from the third compartment to the fourth compartment, a valve operable from the exterior of said valve casing to open and close said valve port from said third to said fourth compartment, and an exit conduit leading from said fourth compartment.

3. An expansion valve comprising a chambered valve casing divided by angularly arranged partition walls into four valve compartments, a supply conduit connected to the first of said compartments, a valve port through one of said partition walls from the first to the second compartment, a valve operable from the exterior of said valve casing to open and close said valve port from the first to the second compartment, a valve port through one of said partition walls from the second to the third of said compartments, a valve operable from the exterior of said valve casing to open and close said valve port from the second to the third compartment, a valve port leading through one of said partition walls from the third compartment to the fourth compartment, a valve operable from the exterior of said valve casing to open and close said valve port from said third to said fourth compartment, and an exit conduit leading from said fourth compartment.

4. An expansion valve comprising a chambered valve casing divided by angularly arranged partition walls into four valve compartments, a plurality of valve ports through said partition walls respectively connecting said first compartment with said second compartment, said second compartment with said third compartment, and said third compartment with said fourth compartment, a plurality of valves whose stems are arranged axially about a common center and which valves are respectively operable from the exterior of the valve casing to open and close said respective valve ports, and inlet and exit conduits connected respectively with said first and said fourth compartment.

5. An expansion valve comprising a chambered valve casing divided by angularly arranged partition walls into four valve compartments, a plurality of valve ports through said partition walls respectively connecting said first compartment with said second compartment, said second compartment with said third compartment, and said third compartment with said fourth compartment, a plurality of valves whose stems are arranged axially about a common center and which valves are respectively operable from the exterior of the valve casing to open and close said respective valve ports, and which inlet and exit conduits are axially arranged to intersect the center common to the axes of said valve stems.

6. An expansion valve comprising a chambered valve casing divided by angularly arranged partition walls into four valve compartments, a plurality of valve ports through said partition walls respectively connecting said first compartment with said second compartment, said second compartment with said third compartment, and said third compartment with said fourth compartment, a plurality of valves whose stems are arranged axially about a common center and which valves are respectively operable from the exterior of the valve casing to open and close said respective valve ports, a port in alignment with the intermediate valve stem through which said second and third compartments may be drained of their contents, and inlet and exit conduits connected respectively with said first and said fourth compartment and with their axes intersecting the center common to the axes of said valve stems.

7. An expansion valve comprising a valve casing divided by partition walls into three or more valve compartments, ports arranged in substantially one plane and connecting said compartments in series, a plurality of valves to open and close said ports; a plurality of valve stems operable from the exterior of said valve casing to actuate said valves and arranged in substantially one plane and radiating from a common point, to enable the machine work upon said valve casing to be effected at one operation.

In testimony whereof I have hereunto affixed my signature.

HENRY D. POWNALL.